United States Patent
Sakai

(10) Patent No.: US 11,239,463 B2
(45) Date of Patent: Feb. 1, 2022

(54) PROCESS FOR PRODUCING CATHODE ACTIVE MATERIAL, CATHODE ACTIVE MATERIAL, POSITIVE ELECTRODE, AND LITHIUM ION SECONDARY BATTERY

(71) Applicant: SUMITOMO CHEMICAL COMPANY, LIMITED, Tokyo (JP)

(72) Inventor: Tomohiro Sakai, Tokyo (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 475 days.

(21) Appl. No.: 15/774,551

(22) PCT Filed: Nov. 9, 2016

(86) PCT No.: PCT/JP2016/083278
§ 371 (c)(1),
(2) Date: May 8, 2018

(87) PCT Pub. No.: WO2017/082314
PCT Pub. Date: May 18, 2017

(65) Prior Publication Data
US 2020/0266436 A1    Aug. 20, 2020

(30) Foreign Application Priority Data

Nov. 11, 2015 (JP) .............................. JP2015-221307

(51) Int. Cl.
*H01M 4/525* (2010.01)
*C01G 53/00* (2006.01)
(Continued)

(52) U.S. Cl.
CPC ............ *H01M 4/525* (2013.01); *C01G 53/50* (2013.01); *H01M 4/505* (2013.01);
(Continued)

(58) Field of Classification Search
CPC ...... H01M 4/505; H01M 4/525; H01M 4/131; H01M 4/1391; H01M 4/485
See application file for complete search history.

(56) References Cited

U.S. PATENT DOCUMENTS

| 9,105,924 B2 | 8/2015 | Endo et al. | |
| 2010/0233542 A1* | 9/2010 | Endo | H01M 4/505 429/223 |

(Continued)

FOREIGN PATENT DOCUMENTS

| CN | 103515585 A | 1/2014 |
| JP | 2009-230863 A | 10/2009 |

(Continued)

OTHER PUBLICATIONS

Xiaoyu Liu, et al., "A new, high energy rechargeable lithium ion battery with a surface-treated Li1.2Mn0.54Ni0.13Co0.13O2 cathode and a nano-structured Li4Ti5O12 anode," Journal of Alloys and Compounds, vol. 648, p. 7-12 (2015).

(Continued)

*Primary Examiner* — Imran Akram
(74) *Attorney, Agent, or Firm* — McDermott Will & Emery LLP

(57) ABSTRACT

To provide a process for producing a cathode active material capable of obtaining a lithium ion secondary battery which has a high discharge capacity and a high initial efficiency, a cathode active material, a positive electrode for a lithium ion secondary battery, and a lithium ion secondary battery. A process for producing a cathode active material, which comprises a mixing step of mixing a lithium compound, an alkali metal compound other than Li, and a transition metal-containing compound containing at least Ni and Mn to obtain a mixture, a step of firing the mixture at a temperature of from 900 to 1,100° C. to obtain a first lithium-containing composite oxide containing the alkali metal other than Li, (Continued)

and a step of removing the alkali metal other than Li from the first lithium-containing composite oxide to obtain a second lithium-containing composite oxide represented by the following formula:

$$aLi(Li_{1/3}Mn_{2/3})O_2 \cdot (1-a)LiMO_2$$

wherein $0<a<1$, and M is an element containing at least Ni and Mn.

17 Claims, 1 Drawing Sheet

(51) Int. Cl.
*H01M 4/505* (2010.01)
*H01M 10/0525* (2010.01)
*H01M 4/02* (2006.01)

(52) U.S. Cl.
CPC ..... *H01M 10/0525* (2013.01); *C01P 2002/52* (2013.01); *C01P 2002/72* (2013.01); *C01P 2002/74* (2013.01); *C01P 2006/40* (2013.01); *H01M 2004/028* (2013.01)

(56) References Cited

U.S. PATENT DOCUMENTS

| | | | | |
|---|---|---|---|---|
| 2012/0217435 | A1* | 8/2012 | Yamamoto | C01G 45/1228 252/182.1 |
| 2013/0327979 | A1* | 12/2013 | Modeki | H01M 4/525 252/182.1 |
| 2014/0004423 | A1 | 1/2014 | Endo et al. | |
| 2014/0138575 | A1* | 5/2014 | Noguchi | H01M 10/0525 252/182.1 |
| 2016/0043396 | A1* | 2/2016 | Sakai | H01M 4/505 429/223 |
| 2016/0056462 | A1 | 2/2016 | Sakai et al. | |
| 2016/0218363 | A1* | 7/2016 | Meng | H01M 10/054 |
| 2016/0351901 | A1* | 12/2016 | Saito | H01M 4/525 |

FOREIGN PATENT DOCUMENTS

| | | |
|---|---|---|
| JP | 2014-026959 A | 2/2014 |
| JP | 2014-029828 A | 2/2014 |
| JP | 2015-118762 A | 6/2015 |
| WO | 2014/192759 A1 | 12/2014 |
| WO | WO-2014192758 A1 * | 12/2014 ............ H01M 4/525 |

OTHER PUBLICATIONS

Search Report issued in corresponding International Patent Application No. PCT/JP2016/083278, dated Jan. 10, 2017.
Notification of Transmittal of translation of the International Preliminary Report on Patentability dated May 24, 2018 in corresponding International Application No. PCT/JP2016/083278 (7 pages).
Chinese Office Action issued in corresponding Chinese Patent Application No. 201680065717.1, dated Jul. 30, 2020, with English translation.

* cited by examiner

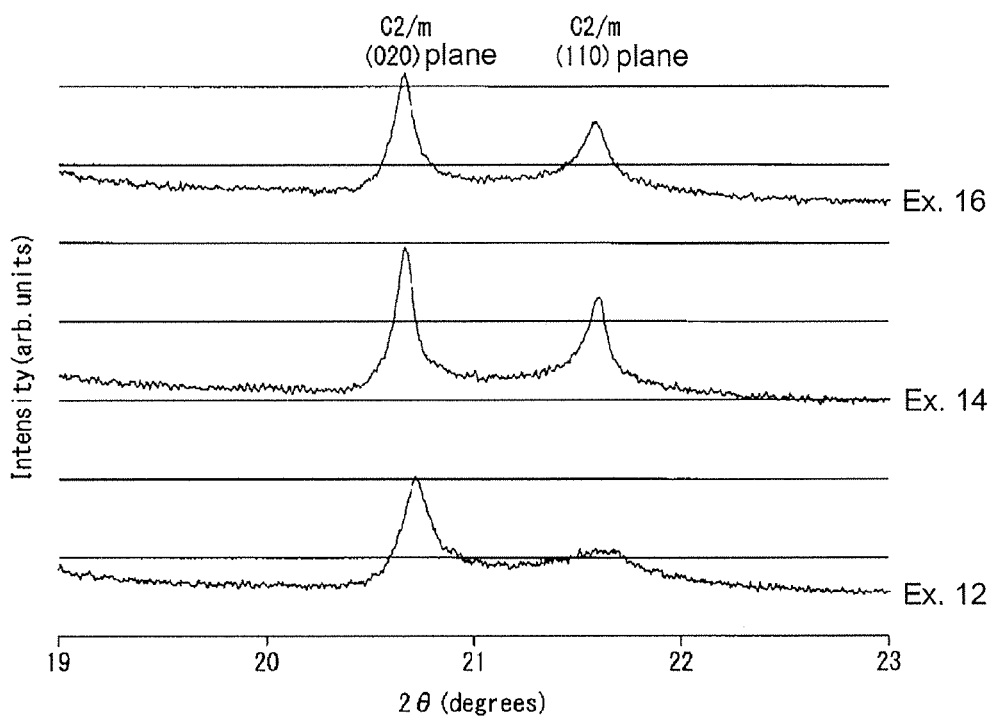

PROCESS FOR PRODUCING CATHODE ACTIVE MATERIAL, CATHODE ACTIVE MATERIAL, POSITIVE ELECTRODE, AND LITHIUM ION SECONDARY BATTERY

CROSS REFERENCE

This application is the U.S. National Phase under 35 U.S.C. § 371 of International Application No. PCT/JP2016/083278, filed on Nov. 9, 2016, which claims the benefit of Japanese Application No. 2015-221307, filed on Nov. 11, 2015, the entire contents of each are hereby incorporated by reference.

TECHNICAL FIELD

The present invention relates to a process for producing a cathode active material, a cathode active material, a positive electrode for a lithium ion secondary battery, and a lithium ion secondary battery.

BACKGROUND ART

As a cathode active material contained in a positive electrode of a lithium ion secondary battery, lithium cobalt oxide ($LiCoO_2$) has been commonly used. However, in recent years, for a lithium ion secondary battery for portable electronic instruments or for vehicles, downsizing and weight saving are required, and a further improvement in the discharge capacity of a lithium ion secondary battery per unit mass of the cathode active material (hereinafter sometimes referred to simply as the discharge capacity) is required.

In recent years, use of a solid solution type lithium-containing composite oxide of $Li_2MnO_3$ and $LiMO_2$ (wherein M essentially contains Mn and Ni and contains other transition metal as an optional component) as a material which can make the discharge capacity of a lithium ion secondary battery high, for a cathode active material, is expected. A cathode active material comprising such a lithium-containing composite oxide is called a lithium-rich cathode active material.

Although a lithium ion secondary battery using such a lithium-rich cathode active material has a high discharged capacity, it has problems in battery characteristics such as rate characteristics.

For example, Patent Document 1 discloses, as a lithium-rich cathode active material capable of improving the rate characteristics of a lithium ion secondary battery, a cathode active material for a lithium secondary battery, containing a lithium transition metal composite oxide represented by the compositional formula $Li_{1+\alpha}Me_{1-\alpha}O_2$ (wherein Me is a transition metal-containing Co, Ni and Mn, and $\alpha>0$) having an $\alpha$-$NaFeO_2$ crystal structure, wherein Na in an amount of at least 1,900 ppm and at most 8,000 ppm is contained, and the 50% particle size ($D_{50}$) in particle size distribution measurement is at most 5 μm. By using a lithium-rich cathode active material containing a lithium transition metal composite oxide containing Na within the above range, a lithium ion secondary battery which has a high discharge capacity and which has improved rate characteristics can be obtained.

Of a lithium ion secondary battery using a lithium-rich cathode active material as disclosed in the above Patent Document 1, etc., problems of the battery characteristics have been gradually dissolved.

However, in order to use the lithium-rich cathode active material as a cathode active material, it is necessary to conduct an activation treatment at the initial stage of use of a lithium ion secondary battery. Since a lithium-rich cathode active material requires this treatment, a lithium ion secondary battery using such a cathode active material has a problem such that the initial irreversible capacity is low, that is, the initial efficiency is low (Non-Patent Document 1).

PRIOR ART DOCUMENTS

Patent Document

Patent Document 1: JP-A-2014-29828

Non-Patent Document

Non-Patent Document 1: Journal of Alloys and Compounds, Vol. 648, 2015, p. 7-12

DISCLOSURE OF INVENTION

Technical Problem

In a lithium ion secondary battery, charging to extract Li from a cathode active material and insert Li into an anode active material, and discharging by which extraction and insertion of Li are reversed, are repeatedly carried out. Accordingly, with a view to making the energy density of a lithium ion secondary battery high, it is necessary to make the specific capacity of the cathode active material close to that of the anode active material. On that occasion, if the initial efficiency of the lithium ion secondary battery is low, some Li extracted from the cathode active material by charging may not be inserted into the cathode active material by discharging. Accordingly, the anode active material is present in excess amount, and thus the total mass or volume of the cathode active material and the anode active material becomes larger when the same energy is taken, whereby the energy density cannot be made high.

Accordingly, as a lithium-rich cathode active material, with a view to making the energy density of the obtainable lithium ion secondary batter high, one which can make the initial efficiency of the lithium ion secondary battery high is expected.

It is an object of the present invention to provide a process for producing a cathode active material capable of obtaining a lithium ion secondary battery which has a high discharge capacity and a high initial efficiency; a cathode active material and a positive electrode for a lithium ion secondary battery capable of providing a lithium ion secondary battery which can reduce the excess amount of an anode active material mounted on the lithium ion secondary battery and which has a high energy density; and a lithium ion secondary battery which can reduce the excess amount of an anode active material mounted on the lithium ion secondary battery and which has a high energy density.

Solution to Problem

The present inventor has conducted extensive studies to achieve the above object and as a result, found that a cathode active material capable of obtaining a lithium ion secondary battery which has a high initial efficiency can be produced by adding, when a precursor and a lithium compound are mixed and fired to produce a lithium-containing composite oxide, an alkali metal other than Li to the lithium-containing composite oxide and removing the alkali metal from the lithium-containing composite oxide after firing.

That is, the process for producing a cathode active material of the present invention (hereinafter sometimes referred to as the present production process) comprises a step of mixing a lithium compound, an alkali metal compound other than Li, and a transition metal-containing compound containing at least Ni and Mn to obtain a mixture, a step of firing the mixture at a temperature of from 900 to 1,100° C. to obtain a first lithium-containing composite oxide containing the alkali metal other than Li, and a step of removing the alkali metal other than Li from the first lithium-containing composite oxide to obtain a second lithium-containing composite oxide represented by the following formula 1:

wherein 0<a<1, and M is an element containing at least Ni and Mn.

Advantageous Effects of Invention

According to the process for producing a cathode active material of the present invention, it is possible to produce a cathode active material capable of obtaining a lithium ion secondary battery which has a high discharge capacity and a high initial efficiency.

According to the cathode active material and the positive electrode for a lithium ion secondary battery of the present invention, it is possible to provide a lithium ion secondary battery which can reduce the excess amount of an anode active material mounted on the lithium ion secondary battery and which has a high energy density.

According to the lithium ion secondary battery of the present invention, the excess amount of an anode active material mounted on the lithium ion secondary battery can be reduced, and the energy density is high.

BRIEF DESCRIPTION OF DRAWING

FIG. 1 is an enlarged view illustrating a part of X-ray diffraction patterns of first lithium-containing composite oxides in Ex. 12, 14 and 16.

DESCRIPTION OF EMBODIMENTS

In this specification, the following terms respectively have the following meanings.

The expression "Li" means a Li element, not a Li metal simple substance, unless otherwise specified. The same applies to expressions of other elements such as Ni, Co and Mn.

The expression "alkali metal" means an alkali metal other than Li, to make the description simple, unless otherwise specified.

A theoretical value means the ratio of the molar amount of Li to the total molar amount (X) of Ni, Co and Mn (i.e. Li/X) when, in the formula $aLi(Li_{1/3}Mn_{2/3})O_2 \cdot (1-a)LiNi_\alpha Co_\beta Mn_\gamma O_2$, the valency of oxygen (O) is bivalent, Li is monovalent, Mn in $Li(Li_{1/3}Mn_{2/3})O_2$ is tetravalent, and in $LiNi_\alpha Co_\beta Mn_\gamma O_2$, Ni is bivalent, Co is trivalent and Mn is tetravalent (in such a case, the average valency is trivalent and electrical neutrality conditions are satisfied, whereby α=γ). Specifically, when the ratios Ni/X, Co/X and Mn/X contained in the transition metal-containing compound are represented by x, y and z (x+y+z=1), respectively, the theoretical value is calculated by Li/X=y+2z.

The formula representing the lithium-containing composite oxide is a formula representing the state before the activation treatment. Activation means removal of lithium oxide ($Li_2O$) or lithium and lithium oxide from the lithium-containing composite oxide.

Process for Producing Cathode Active Material

Mixing Step

The present production process comprises a step of mixing a lithium compound, an alkali metal compound and a transition metal-containing compound containing at least Ni and Mn to obtain a mixture.

The lithium compound used in the mixing step is not particularly limited. Lithium hydroxide, lithium carbonate or lithium nitrate may, for example, be mentioned. From the viewpoint of handling efficiency, lithium hydroxide or lithium carbonate is preferred.

The alkali metal compound may, for example, be an oxide, hydroxide, carbonate, sulfate, nitrate or chloride of an alkali metal. The alkali metal is preferably one having an ion radius relatively close to that of a Li ion in that the crystal structure of the lithium-containing composite oxide having the alkali metal removed shows high stability. Accordingly, the alkali metal is preferably Na or K, more preferably Na. The compound of such an alkali metal may, for example, be sodium carbonate, sodium hydrogen carbonate, sodium hydroxide, lithium sulfate, sodium nitrate, lithium chloride, potassium carbonate, potassium hydrogen carbonate, potassium hydroxide, potassium sulfate, potassium nitrate or potassium chloride. Among them, sodium carbonate is preferred.

The transition metal-containing compound may, for example, be a hydroxide or carbonate containing transition metals. The transition metal-containing compound is preferably a hydroxide containing transition metals in that the cycle characteristics of a lithium ion secondary battery using a cathode active material containing the obtainable second lithium-containing composite oxide will readily be made favorable. In this specification, hereinafter a hydroxide includes an oxyhydroxide which is partly oxidized.

The transition metal-containing compound contains at least Ni and Mn and as the case requires, contains other element (M). Such other element may, for example, be Co, Mg, Ca, Ba, Sr, Al, Cr, Fe, Ti, Zr, Y, Nb, Mo, Ta, W, Ce or La. In order that the output characteristics of a lithium ion secondary battery using a cathode active material containing the second lithium-containing composite oxide are to be high, the transition metal-containing compound preferably contains Ni, Mn and Co.

The composition of the metals contained in the transition metal-containing compound is preferably such that to the total molar amount (X) of Ni, Co and Mn contained in the transition metal-containing compound, the ratio of the molar amount of Ni (i.e. Ni/X) is from 0.15 to 0.55, the ratio of the molar amount of Mn (i.e. Mn/X) is from 0.45 to 0.8, and the ratio of the molar amount of other metal (i.e. M/X) is from 0 to 0.09.

In a case where the transition metal-containing compound contains Co, the composition of the metals is preferably such that the above Ni/X is from 0.15 to 0.55, the above Mn/X is from 0.45 to 0.8, the ratio of the molar amount of Co (i.e. Co/X) is from 0.01 to 0.09, and the ratio of the molar amount of other element (excluding Co) (i.e. M'/X) is from 0 to 0.09.

The transition metal-containing compound may be prepared, for example, by a coprecipitation method. The coprecipitation method may, for example, be an alkali coprecipitation method or a carbonate coprecipitation method. The transition metal-containing compound is preferably produced by the alkali coprecipitation method in that the cycle characteristics of a lithium ion secondary battery using the obtainable cathode active material can thereby easily be made good.

The specific surface area of the transition metal-containing compound is preferably from 3 to 60 $m^2/g$, more preferably from 5 to 50 $m^2/g$. When the specific surface area of the transition metal-containing compound is within the above range, the specific surface area of the cathode active material can be easily controlled to be within a preferred range. The specific surface area of the transition metal-containing compound is a value measured after drying the transition metal-containing compound at 120° C. for 15 hours.

The average particle size ($D_{50}$) of the transition metal-containing compound is preferably from 3 to 15.5 μm, more preferably from 3 to 12.5 μm, further preferably from 3 to 10.5 μm. When $D_{50}$ of the transition metal-containing compound is within the above range, $D_{50}$ of the cathode active material can be easily controlled to be within a preferred range.

The average particle size ($D_{50}$) is a particle size at a point of 50% on an accumulative volume distribution curve which is drawn by obtaining the particle size distribution on the volume basis and taking the whole to be 100%, that is, a volume-based accumulative 50% size. The particle size distribution is obtained from the frequency distribution and accumulative volume distribution curve measured by means of a laser scattering particle size distribution measuring apparatus (for example, a laser diffraction/scattering particle size distribution measuring apparatus). The measurement is carried out by sufficiently dispersing the powder in an aqueous medium by e.g. ultrasonic treatment.

The mixing ratio of the respective components in the mixing step is preferably such that the ratio of the total molar amount of Li and the alkali metal (R) (i.e. Li+R) to the total molar amount (X) of Ni, Co and Mn contained in the transition metal-containing compound (i.e. (Li+R)/X) is set to be higher than the molar ratio of Li to the above X (i.e. Li/X) as a theoretical value. By setting the mixing ratio of lithium compound, the alkali metal compound and the transition metal-containing compound containing at least Ni and Mn to be higher than the above theoretical value, it is possible to prevent a heterogeneous phase from being contained in the first lithium-containing composite oxide even if Li is volatilized during firing.

In the mixing step, the mixing ratio of the respective components is preferably such that the ratio of the total molar amount of Li contained in the lithium compound and the alkali metal (R) contained in the alkali metal compound (i.e. Li+R) to the total molar amount (X) of Ni, Co and Mn contained in the transition metal-containing compound (i.e. (Li+R)/X) is from 1.1 to 1.8. When the mixing ratio is within such a range, a solid solution type lithium-containing composite oxide can be obtained via a firing step.

The ratio of the alkali metal (R) contained in the alkali metal compound to the total molar amount (X) of Ni, Co and Mn contained in the transition metal-containing compound (i.e. R/X) is preferably from 0.001 to 0.5. When the ratio is within such a range, a solid solution type lithium-containing composite oxide will be obtained. The ratio is more preferably from 0.01 to 0.5, further preferably from 0.02 to 0.5.

The ratio of Li contained in the lithium compound to the total molar amount (X) of Ni, Co and Mn contained in the transition metal-containing compound (i.e. Li/X) is preferably from 1.1 to 1.8. When the ratio is less than the lower limit value, the first lithium-containing composite oxide may undergo phase splitting. If the first lithium-containing composite oxide undergoes phase splitting, the second lithium-containing composite oxide also undergoes phase splitting. If a cathode active material having a phase-split lithium-containing composite oxide is used, the initial efficiency of the obtainable lithium ion secondary battery may decrease. If the above ratio is higher than the upper limit value, lithium (free lithium) which is not included in the crystals of the first lithium-containing composite oxide may increase. If a cathode active material having a lithium-containing composite oxide with a large amount of free lithium is used, the initial efficiency of the obtainable lithium ion secondary battery may decrease. The above ratio is more preferably from 1.1 to 1.7, further preferably from 1.2 to 1.7.

The method for mixing the lithium compound, the alkali metal compound and the transition metal-containing compound containing at least Ni and Mn may, for example, be a method of using a rocking mixer, a Nauta mixer, a spiral mixer, a cutter mill or a V mixer. The mixing method is not limited to the above method so long as a uniform mixture is obtained.

In the mixing step, a compound other than the transition metal-containing compound containing at least Ni and Mn may be mixed. Such other compound may be a compound containing F, Mg, Ca, Ba, Sr, Al, Cr, Fe, Ti, Zr, Y, Nb, Mo, Ta, W, Ce or La. By using a lithium-containing composite oxide obtained by mixing such other compound, followed by firing, as a cathode active material, the discharge capacity of the obtainable lithium ion secondary battery can be made high. Among them, at least one member selected from the group consisting of F, Mg, Al, Cr, Fe, Ti and Zr is preferred. Such other compound is preferably an oxide, carbonate, nitrate or the like containing the above element from the viewpoint of handling efficiency.

Firing Step

The present production process comprises a step of firing the mixture obtained in the mixing step at a temperature of from 900 to 1,100° C. to obtain a first lithium-containing composite oxide containing Li and the alkali metal.

The firing temperature is from 900 to 1,100° C., preferably from 930 to 1,075° C., more preferably from 950 to 1,050° C. When the firing temperature is at least the lower limit of the above range, crystallization of the first lithium-containing composite oxide will sufficiently proceed. When crystallization sufficiently proceed, it is possible to obtain a cathode active material capable of obtaining a lithium ion secondary battery having excellent cycle characteristics. When the firing temperature is at most the upper limit value of the above range, volatilization of Li and the alkali metal in the firing step can be suppressed, and a first lithium-containing composite oxide of which the ratio of Li and the alkali metal agrees with the charge ratio can be obtained.

In the firing step, firing is preferably carried out in the atmospheric air, particularly preferably while supplying air, whereby the transition metal-containing compound is oxidized. By supplying air at the time of firing, it is possible to obtain a first lithium-containing composite oxide having high crystallinity and having a crystal structure with space group C2/m and a crystal structure with space group R-3m.

The supply rate of air is preferably from 10 to 200 mL/min, more preferably from 40 to 150 mL/min per 1 L (liter) of the inner volume of the furnace.

In the firing step, it is preferred to carry out temporary firing at a temperature lower than the above firing temperature before firing at the above firing temperature. By carrying out temporary firing, Li will readily be dispersed uniformly in the first lithium-containing composite oxide. The firing temperature in temporary firing is preferably from 400 to 700° C., more preferably from 500 to 650° C.

The firing time in the firing step is preferably from 4 to 40 hours, more preferably from 4 to 20 hours.

The firing apparatus may, for example, be an electric furnace, a continuous firing furnace or a rotary kiln.

Alkali Metal Removing Step

The present production process comprises a step of removing the alkali metal other than Li from the first lithium-containing composite oxide to obtain a second lithium-containing composite oxide. By this step, excess Li and alkali metal which cannot return to the cathode active material at the time of discharging are removed. As a result, the initial efficiency of a lithium ion secondary battery using the obtainable cathode active material can be made high.

The molar amount of the alkali metal contained in the second lithium-containing composite oxide is preferably at most 0.04, more preferably at most 0.015, by the ratio to the total molar amount of Ni, Co and Mn. When the amount of the alkali metal present is within the above ratio, the alkali metal will not adversely affect the battery characteristics. The ratio of the molar amount of the alkali metal to the total molar amount of Ni, Co and Mn is preferably at least 0.001.

The method of removing the alkali metal from the first lithium-containing composite oxide is not particularly limited. As a method of removing the alkali metal from the first lithium-containing composite oxide, preferred is a method of bringing the first lithium-containing composite oxide and an aqueous solution having a pH of at most 8 at 25° C. into contact with each other to elute and remove the alkali metal from the first lithium-containing composite oxide. By such a method, the alkali metal can be efficiently removed from the first lithium-containing composite oxide. Some of Li may be removed simultaneously with removal of the alkali metal.

The aqueous solution having a pH of at most 8 to be brought into contact with the first lithium-containing composite oxide may be water or an acidic aqueous solution. With a view to efficiently removing the alkali metal, the pH of the aqueous solution is preferably from 0 to 6, more preferably from 0 to 5, further preferably from 0 to 4.

Further, the aqueous solution may contain a pH adjusting agent, etc. for the purpose of improving the handling efficiency.

The acidic aqueous solution having a pH of at most 8 preferably contains an acid component containing no F. A preferred acid component in the acidic aqueous solution may be lactic acid, sulfuric acid, carbonic acid, citric acid, glycolic acid, malic acid, tartaric acid, gluconic acid, oxalic acid, malonic acid, succinic acid, glutaric acid, adipic acid, maleic acid, fumaric acid, phthalic acid, formic acid, acetic acid, propionic acid, ascorbic acid, nitric acid, hydrochloric acid, boric acid, phosphoric acid or perchloric acid. With a view to improving the handling efficiency, at least one member selected from the group consisting of nitric acid, sulfuric acid, hydrochloric acid, lactic acid and acetic acid is more preferred. Further, the acid components may be used alone or in combination of two or more.

As the method of bringing the first lithium-containing composite and the aqueous solution having a pH of at most 8, for example, a method of adding the first lithium-containing composite oxide to the aqueous solution, followed by stirring for mixing may be mentioned. Contact of the first lithium-containing composite oxide and the aqueous solution having a pH of at most 8 may be conducted several times.

The temperature of the aqueous solution having a pH of at most 8 when brought into contact with the first lithium-containing composite oxide is, with a view to improving workability, preferably from 10 to 90° C., more preferably from 20 to 60° C. Particularly when the pH of the aqueous solution is higher than 4, in order that the alkali metal is sufficiently eluted from the first lithium-containing composite oxide, the removing step is carried out preferably at a temperature of the aqueous solution having a pH of at most 8 being 40° C. or higher.

The time over which the first lithium-containing composite oxide and the aqueous solution having a pH of at most 8 are brought into contact with each other is not particularly limited. In order that the alkali metal is sufficiently eluted from the first lithium-containing composite oxide, it is preferably at least 0.5 hour, more preferably at least 1 hour. The upper limit of the contact time is, in view of the productivity, preferably at most 48 hours, more preferably at most 24 hours.

In a case where the acidic aqueous solution is used as the aqueous solution having a pH of at most 8, the relative amount (A1) of the acid component obtained in accordance with the following formula 2 is preferably from 0.005 to 0.20, more preferably from 0.02 to 0.15. The relative amount (A1) of the acid component is a value obtained by multiplying the ratio of the molar amount of the acid component contained in the aqueous solution having a pH of at most 8 to the total molar amount of the transition metal elements contained in the first lithium-containing composite oxide, by an absolute value of the valency of the acid component. When the relative amount (A1) of the acid component is at least the lower limit value of the above range, the amount of elution of the alkali metal will be sufficient, and when it is at most the upper limit value, elution of the transition metal elements can be reduced.

Relative amount (A1) of acid component={molar amount of acid component contained in aqueous solution having pH of at most 8/total molar amount of transition metal element contained in first lithium-containing composite oxide}×{absolute value of valency of acid component}  formula 2

After the first lithium-containing composite oxide and the aqueous solution having a pH of at most 8 are brought into contact with each other, the aqueous solution having a pH of 8 is separated to obtain a second lithium-containing composite oxide. As a method of separating the aqueous solution having a pH of at most 8, conventional solid-liquid separation may be employed. Specifically, filtration, sedimentation or centrifugal separation may, for example, be mentioned. In a case where the acidic aqueous solution is used as the aqueous solution having a pH of at most 8, it is preferred to wash the surface of the second lithium-containing composite oxide with e.g. water, at the time of separating the aqueous solution having a pH of at most 8.

The second lithium-containing composite oxide is, after separated from the aqueous solution having a pH of at most 8, preferably dried by heating to remove excess moisture, adsorbate, etc., whereby the second lithium-containing composite oxide will easily be handled.

The heating temperature for drying is preferably from 40 to 300° C., more preferably from 60 to 200° C. When the heating temperature is within the above range, the second lithium-containing composite oxide will efficiently be dried.

The heating time for drying is not particularly limited and is preferably, for example, from 0.5 to 30 hours, more preferably from 1 to 20 hours.

The chemical composition of the second lithium-containing composite oxide obtained by the present production process is represented by the following formula 1, and is preferably such that the ratio of the molar amount of the alkali metal to the total molar amount of Ni, Co and Mn contained in the second lithium-containing composite oxide is at most 0.04.

$$aLi(Li_{1/3}Mn_{2/3})O_2 \cdot (1-a)LiMO_2 \qquad \text{formula 1}$$

wherein, "a" is more than 0 and less than 1, and M is an element containing at least Ni and Mn.

When "a" is more than 0 and less than 1 in the formula 1, the discharge capacity and the discharge voltage of the obtainable lithium ion secondary battery can be made high. "a" is preferably at least 0.15 and at most 0.78, more preferably at least 0.2 and at most 0.75.

In the formula 1, M is an element containing at least Ni and Mn. Further, M preferably contains Co and preferably contains no Li. Further, M may contain an element other than Li, Ni, Co and Mn. Such other element may, for example, be F, P, Mg, Ca, Ba, Sr, Al, Cr, Fe, Ti, Zr, Y, Nb, Mo, Ta, W, Ce or La. With a view to increasing the discharge capacity of the obtainable lithium ion secondary battery, other element contained in M is preferably at least one member selected from the group consisting of F, Mg, Al, Cr, Fe, Ti and Zr.

In the second lithium-containing composite oxide, the ratio of the molar amount of the alkali metal to the total molar amount (X) of Ni, Co and Mn is more preferably at most 0.025, further preferably at most 0.02. The lower limit of the ratio of the molar amount is not limited, and is preferably at least 0.001, more preferably at least 0.002.

The chemical composition of the second lithium-containing composite oxide is preferably one represented by the following formula 3.

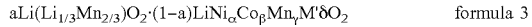
$$aLi(Li_{1/3}Mn_{2/3})O_2 \cdot (1-a)LiNi_\alpha Co_\beta Mn_\gamma M'_\delta O_2 \qquad \text{formula 3}$$

wherein "a" is more than 0 and less than 1, M' is the above other element, and $\alpha+\beta+\gamma+\delta=1$.

In the formula 3, $\alpha$ is the molar ratio of Ni contained in the layered rock salt crystal structure. $\alpha$ is preferably 0 and less than 1. When $\alpha$ is within such a range, the discharge capacity and the discharge voltage of the obtainable lithium ion secondary battery can be made high. $\alpha$ is more preferably at least 0.36 and less than 1, more preferably at least 0.40 and at most 0.83.

In the formula 3, $\beta$ is the molar ratio of Co contained in the layered rock salt crystal structure. $\beta$ is preferably 0 and less than 1. When $\beta$ is within the above range, the rate characteristics of the of the lithium ion secondary battery can be made high. $\beta$ is more preferably at least 0 and at most 0.33, further preferably more than 0 and at most 0.1.

In the formula 3, $\gamma$ is the molar ratio of Mn contained in the layered rock salt crystal structure. $\gamma$ is preferably more than 0 and at most 0.5. When $\gamma$ is within the above range, the discharge voltage and the discharge capacity of the lithium ion secondary battery can be made high. $\gamma$ is more preferably at least 0.25 and at most 0.5, further preferably at least 0.3 and at most 0.5.

In the formula 3, $\delta$ is the molar ratio of other element (M') contained in the layered rock salt crystal structure. $\delta$ is preferably at least 0 and at most 0.05. When $\delta$ is within the above range, the discharge capacity of the lithium ion secondary battery can be made high.

The ratio (Ni/X) of the molar amount of Ni to the total molar amount (X) of Ni, Co and Mn in the second lithium-containing composite oxide is preferably from 0.15 to 0.55. When Ni/X is within the above range, the discharge capacity and the discharge voltage of the lithium ion secondary battery can be made higher. Further, with a view to making the discharge voltage of the lithium ion secondary battery higher, Ni/X is more preferably from 0.15 to 0.5, further preferably from 0.2 to 0.4.

The ratio (Co/X) of the molar amount of Co to the total molar amount (X) of Ni, Co and Mn in the second lithium-containing composite oxide is preferably from 0 to 0.09. When Co/X is within the above range, the rate characteristics of the lithium ion secondary battery can be made higher. Further, with a view to making the cycle characteristics of the lithium ion secondary battery more favorable, Co/X is more preferably from 0 to 0.07, further preferably from 0 to 0.05.

The ratio (Mn/X) of the molar amount of Mn to the total molar amount (X) of Ni, Co and Mn in the second lithium-containing composite oxide is preferably from 0.45 to 0.8. When Mn/X is within the above range, the discharge voltage and the discharge capacity of the lithium ion secondary battery can be made higher. Further, with a view to making the discharge voltage of the lithium ion secondary battery higher, the upper limit of Mn/X is more preferably 0.78. With a view to making the discharge capacity of the lithium ion secondary battery higher, the lower limit of Mn/X is more preferably 0.5.

The second lithium-containing composite oxide contains $Li(Li_{1/3}Mn_{2/3})O_2$ having a layered rock salt crystal structure with space group C2/m and $LiMO_2$ (wherein M is an element containing at least Ni and Mn) having a layered rock salt crystal structure with space group R-3 m.

The crystal structure of the second lithium-containing composite oxide can be confirmed by X-ray diffraction measurement (XRD measurement). The X-ray diffraction measurement is conducted by the method under the conditions as disclosed in Examples. In an X-ray diffraction pattern, as peaks assigned to space group R-3m, a peak corresponding to (003) plane appears at $2\theta=18$ deg. to 20 deg. In an XRD pattern, as peaks assigned to space group C2/m, a peak corresponding to (020) plane appears at $2\theta=20$ to 21 deg., and a peak corresponding to (110) plane appears at $2\theta=21$ to 22 deg.

In the X-ray diffraction pattern of the second lithium-containing composite oxide, the crystallite diameter ($D_{003}$) obtained by the Scheller equation from a peak of (003) plane assigned to a crystal structure with space group R-3m is preferably from 60 to 140 nm, more preferably from 60 to 120 nm, further preferably from 60 to 115 nm. When $D_{003}$ is at least the lower limit value of the above range, the cycle characteristics of the obtainable lithium ion secondary battery tend to be favorable. When $D_{003}$ is at most the upper limit value of the above range, the discharge capacity of the obtainable lithium ion secondary battery tends to be high.

In the X-ray diffraction pattern of the second lithium-containing composite oxide, the crystallite diameter ($D_{110}$) obtained by the Scheller equation from a peak of (110) plane assigned to a crystal structure with space group R-3m is preferably from 30 to 80 nm, more preferably from 35 to 80 nm, further preferably from 40 to 80 nm. When $D_{110}$ is at least the lower limit value of the above range, the stability of the crystal structure will improve. When $D_{110}$ is at most the upper limit value of the above range, the cycle characteristics of the lithium ion secondary battery tend to be favorable.

In the X-ray diffraction pattern of the second lithium-containing composite oxide, the ratio of the height ($H_{110}$) of a peak of (110) plane assigned to a crystal structure with space group C2/m to the height ($H_{003}$) of a peak of (003) plane assigned to a crystal structure with space group R-3m (i.e. $H_{110}/H_{003}$) is preferably at least 0.018, more preferably at least 0.02. Further, $H_{110}/H_{003}$ is preferably at most 0.06, more preferably at most 0.05.

Further, the integral breadth of a peak of (110) plane assigned to a crystal structure with space group C2/m is preferably at most 0.5 deg. The integral breadth is more preferably from 0.1 deg. to 0.45 deg. The integral breadth is the width when the peak of (110) plane in the X-ray diffraction pattern is calculated to a rectangle with the same area and height.

Covering Step

The present production process may comprise a covering step of forming a covering layer on the surface of the second lithium-containing composite oxide. By forming the covering layer on the surface of the second lithium-containing composite oxide, it is possible to obtain a cathode active material capable of obtaining a lithium ion secondary battery having high cycle characteristics.

The method for forming the covering layer on the surface of the second lithium-containing composite oxide may, for example, be a powder mixing method, a gas phase method, a spray coating method or a dipping method. Now, a method of forming a covering layer will be described with reference to a case where the covering layer is an Al compound.

The powder mixing method is a method of mixing the second lithium-containing composite oxide and the Al compound, followed by heating.

The gas phase method is a method of gasifying an organic compound containing Al, such as aluminum ethoxide, aluminum isopropoxide or aluminum acetylacetonate, and letting the organic compound be in contact with the surface of the second lithium-containing composite oxide and reacted.

The spray coating method is a method of spraying a solution containing Al to the second lithium-containing composite oxide, followed by heating.

The dipping method is a method of dipping the second lithium-containing composite oxide in an aqueous solution having dissolved in a solvent, a water-soluble Al compound (such as aluminum acetate, aluminum oxalate, aluminum citrate, aluminum lactate, basic aluminum lactate or aluminum nitrate) to form an Al compound, to bring them into contact with each other, followed by heating to remove the solvent.

As the covering layer, particles of a compound containing a metal may be mentioned. The compound containing a metal is preferably a compound containing a metal in Group 3 to 13 of the periodic table, or a lithium compound.

The metal in the compound containing a metal in Group 3 to 13 of the periodic table is preferably at least one metal selected from the group consisting of Al, Y, Ga, In, La, Pr, Nd, Gd, Dy, Er and Yb. The compound may, for example, be an oxide, a halide, a phosphate or a sulfate. With a view to forming an electrochemically stable covering layer, preferred is $Al_2O_3$, $Y_2O_3$, $Gd_2O_3$, $Er_2O$, $AlF_3$, $Al_2(PO_4)_3$ or $Al_2(SO_4)_3$.

The lithium compound may be a compound containing Li and at least one member selected from the group consisting of S, B and F. Specifically, it may be $Li_2SO_4$, $Li_3BO_3$, $Li_2B_4O_7$, LiF or a hydrate thereof.

The mass of the covering layer is preferably at least 0.01 mass % and at most 10 mass %, more preferably at least 0.05 mass % and at most 5 mass %, particularly preferably at least 0.1 mass % and at most 3 mass % to the mass of the second lithium-containing composite oxide.

With respect to the cathode active material obtained by the present production process, the shape of primary particles and secondary particles of the second lithium-containing composite oxides is preferably spherical. When the second lithium-containing composite oxide is spherical, the electrode density can be made high when the cathode active material is formed into an electrode.

The average particle size ($D_{50}$) of the cathode active material obtained by the present production process is preferably from 3 to 30 μm, more preferably from 4 to 25 μm, further preferably from 5 to 20 μm. When the average particle size ($D_{50}$) is from 3 to 30 μm, the electrode density when the cathode active material is formed into an electrode can be made high.

The average particle size ($D_{50}$) is a value measured by the above method.

The specific surface area of the cathode active material obtained by the present production process is preferably from 0.1 to 10 $m^2/g$, more preferably from 0.15 to 5 $m^2/g$. When the specific surface area of the cathode active material is within the above range, the discharge capacity can be made high, and the electrode density can be made high.

The specific surface area is a value measured by a BET (Brunauer, Emmet, Teller) method. In the measurement of the specific surface area, nitrogen gas is used as an absorption gas.

Positive Electrode for Lithium Ion Secondary Battery

The positive electrode for a lithium ion secondary battery of the present invention (hereinafter referred to as the present positive electrode) comprises a cathode active material layer containing a cathode active material obtained by the above process for producing a cathode active material, a binder and an electrically conductive material, formed on a positive electrode current collector.

As a method of forming the cathode active material layer on the positive electrode current collector, a known means may be employed. For example, the cathode active material, the electrically conductive material and the binder are dissolved or dispersed in a medium to obtain a slurry, or the cathode active material, the electrically conductive material and the binder are kneaded with a medium to obtain a kneaded product. Then, the obtained slurry or kneaded product is applied to the positive electrode current collector to form the cathode active material layer.

As the electrically conductive material, carbon black such as acetylene black, graphite or ketjen black may, for example, be mentioned. The electrically conductive material may be used alone or as a mixture of two or more.

The binder may, for example, be a fluororesin, a polyolefin, a polymer or copolymer having unsaturated bonds, an acrylate polymer or copolymer such as an acrylate copolymer or a methacrylate copolymer. The fluorinated resin may, for example, be polyvinylidene fluoride or polytetrafluoroethylene. The polyolefin may, for example, be polyethylene or polypropylene. The polymer or copolymer having unsaturated bonds may, for example, be a polymer or copolymer having unsaturated bonds, such as a styrene/butadiene rubber, an isoprene rubber or a butadiene rubber.

As the positive electrode current collector, an aluminum foil or an aluminum alloy foil may be mentioned.

Lithium Ion Secondary Battery

The lithium ion secondary battery of the present invention (hereinafter referred to as the present battery) comprises the present positive electrode, a negative electrode, a non-aqueous electrolyte and a separator. The lithium ion secondary battery may be produced by a known means using the above components.

The negative electrode is obtained by forming an anode active material layer containing an anode active material on the negative electrode current collector. For example, the anode active material is kneaded with an organic solvent to prepare a slurry, and the prepared slurry is applied to a negative electrode current collector, followed by drying and pressing to produce the negative electrode.

As the negative electrode current collector, for example, a nickel foil or a copper foil may be used.

The anode active material may be any material so long as it is capable of adsorbing and desorbing lithium ions at a relatively low potential and may, for example, be a lithium metal, a lithium alloy, a carbon material, an oxide composed mainly of metal in group 14 or 15 of the Periodic Table, a carbon compound, a silicon carbide compound, a silicon oxide compound, titanium sulfide or a boron carbide compound.

The carbon material to be used for the anode active material may, for example, be non-graphitized carbon, artificial graphite, natural graphite, thermally decomposed carbon, cokes, graphites, glassy carbons, an organic polymer compound fired product, carbon fibers, activated carbon or carbon black. The cokes may, for example, be pitch coke, needle coke or petroleum coke. The organic polymer compound fired product may, for example, be a product obtained by firing and carbonizing a phenol resin, a furan resin or the like at an appropriate temperature.

The metal in group 14 of the Periodic Table may, for example, be Si or Sn. Among them, the metal in group 14 of the Periodic Table is preferably Si.

The non-aqueous electrolyte may, for example, be a non-aqueous electrolytic solution having an electrolyte salt dissolved in an organic solvent; an inorganic solid electrolyte; or a solid or gelled polymer electrolyte in which an electrolyte salt is mixed or dissolved.

The organic solvent may be an organic solvent known for a non-aqueous electrolytic solution. It may, for example, be propylene carbonate, ethylene carbonate, diethyl carbonate, dimethyl carbonate, 1,2-dimethoxyethane, 1,2-diethoxyethane, γ-butyrolactone, diethyl ether, sulfolane, methyl sulfolane, acetonitrile, an acetic acid ester, a butyric acid ester or a propionic acid ester. Among them, in view of the voltage stability, the organic solvent is preferably a cyclic carbonate such as propylene carbonate or a chain-structured carbonate such as dimethyl carbonate or diethyl carbonate. The organic solvent may be used alone or as a mixture of two or more.

The inorganic solid electrolyte may, for example, be lithium nitride or lithium iodide.

The polymer compound to be used for the solid polymer electrolyte in which an electrolyte salt is mixed or dissolved, may, for example, be polyethylene oxide, polypropylene oxide, polyphosphazene, polyaziridine, polyethylene sulfide, polyvinyl alcohol, polyvinylidene fluoride, polyhexafluoropropylene, or a derivative, mixture or composite thereof.

The polymer compound to be used for the gelled polymer electrolyte in which an electrolyte salt is mixed or dissolved, may, for example, be a fluorinated polymer compound, polyacrylonitrile, a copolymer of polyacrylonitrile, polyethylene oxide or a copolymer of polyethylene oxide. The fluorinated polymer compound may, for example, be poly(vinylidene fluoride) or poly(vinylidene fluoride-co-hexafluoropropylene).

As the matrix of the gelled electrolyte, a fluorinated polymer compound is preferred from the viewpoint of the stability against an oxidation-reduction reaction.

As the electrolyte salt, any known one commonly used for a lithium ion secondary battery may be used, such as $LiClO_4$, $LiPF_6$, $LiBF_4$ or $CF_3SO_3Li$.

As the separator, a microporous polyolefin film represented by polyethylene and polypropylene, a film composed of a copolymer of polyvinylidene fluoride and hexafluoropropylene, or a composite film comprising a microporous polyolefin film and inorganic particles, an aramid resin, a fluororesin or the like applied to the film surface may, for example, be mentioned.

The shape of the lithium ion secondary battery is not particularly limited and may, for example, be a coin-shape, a sheet-form (film-form), a folded shape, a wound cylinder with bottom, or a button shape, and is suitably selected depending upon the intended use.

EXAMPLES

Now, the present invention will be described in detail with reference to Examples, but it should be understood that the present invention is by no means thereby restricted. Ex. 1 to 4, 7 to 11, 16 and 17 are Examples of the present invention, Ex. 12 is a Comparative Example, and Ex. 5, 6 and 13 to 15 are Reference Examples.

Composition Analysis

Composition analysis of the second lithium-containing composite oxide was carried out by a plasma emission spectroscope (SPS3100H manufactured by SII NanoTechnology Inc.). From the ratio of the molar amounts of Li, Ni, Co and Mn obtained from the composition analysis, "a", α, β and γ in the formula: $aLi(Li_{1/3}Mn_{2/3})O_2 \cdot (1-a) LiNi_\alpha Co_\beta Mn_\gamma O_2$ were calculated.

Further, the ratio of the molar amount of Na to the total molar amount of Ni, Co and Mn contained in the second lithium-containing composite oxide was calculated.

X-ray Diffraction Measurement

The X-ray diffraction of the second lithium-containing composite oxide was measured by means of an X-ray diffraction apparatus (manufactured by Rigaku Corporation, apparatus name: SmartLab). The measurement conditions are shown in Table 1. The measurement was carried out at 25° C. Before the measurement, 1 g of the lithium-containing composite oxide and 30 mg of reference sample 640e for X-ray diffraction were mixed in an agate mortar, and this mixture was used as the sample for the measurement.

With respect to the X-ray diffraction pattern obtained, peak search was carried out by using integrated X-ray powder diffraction software PDXL2 manufactured by Rigaku Corporation.

From the respective peaks, the crystallite diameter $D_{003}$ of (003) plane assigned to a crystal structure with space group R-3m, the crystallite diameter $D_{110}$ of (110) plane assigned to a crystal structure with space group R-3m, the ratio of the height ($H_{110}$) of a peak of (110) plane assigned to a crystal structure with space group R-3m to the height ($H_{003}$) of a peak of (003) plane assigned to a crystal structure with space group R-3m (i.e. $H_{110}/H_{003}$), and the integral breadth of a peak of (110) plane assigned to a crystal structure with space group C2/m were calculated.

TABLE 1

| Apparatus condition | Measurement apparatus | SmartLab manufactured by Rigaku Corporation |
|---|---|---|
| | Target | Cu |
| | Detector | D/teX Ultra HE manufactured by Rigaku Corporation |
| | Detector baseline | 44div |
| | Detector window | 8div |
| | Gonio length | 300 mm |
| | Soller/PSC | 5.0 (deg.) |
| | IS long dimension | 10 (mm) |
| | PSA | Open |
| | Soller | 5.0 (deg.) |
| | Monochromatization method | Kβ filter method |
| Sample condition | Sample holder | Diameter: 24 mm, depth: 0.5 mm |
| | Rotation of sample during measurement | Rotated (30 rpm) |
| Measurement condition | Measurement method | General purpose measurement (focal method) |
| | Scanning axis | 2θ/θ |
| | Mode | Continuous |
| | Range specification | Absolute |
| | Initiation (deg.) | 15 (deg.) |
| | Termination (deg.) | 70 (deg.) |
| | Step (deg.) | 0.0052 (deg.) |
| | Speed measurement time | 1 (deg./min.) |
| | IS (deg.) | ⅓ (deg.) |
| | RS1 (mm) | 8 (mm) |
| | RS2 (mm) | 13 (mm) |
| | Attenuator | Open |
| | Tube voltage (kV) | 45 (kV) |
| | Tube current (mA) | 200 (mA) |
| Data processing condition | Analysis software | PDXL2 manufactured by Rigaku Corporation |
| | Smoothing | Smoothing by B-Spline, X threshold: 1.50, Smoothing parameter 10.00, smoothing point 11 |
| | Background removal | Fitting Peak threshold 1.00, intensity threshold 10.00 |
| | Kα2 removal | Intensity ratio: 0.4970 |
| | Peak search | Secondary differentiation, σ cut: 3.00 |
| | Profile fitting | Fitting of measurement data |
| | Peak shape | Variance pseudo-voigt function |

Particle Size

The hydroxide or the cathode active material which was the transition metal-containing compound to be measured was sufficiently dispersed in water by ultrasonic treatment, and measurement was conducted by a laser diffraction/scattering type particle size distribution measuring apparatus (MT-3300EX, manufactured by NIKKISO CO., LTD.) to obtain the frequency distribution and accumulative volume distribution curve thereby to obtain a volume-based particle size distribution. From the obtained accumulative volume distribution curve, $D_{10}$, $D_{50}$ and $D_{90}$ were obtained.

Specific Surface Area

The specific surface area of the hydroxide or the cathode active material which was the transition metal-containing compound to be measured was calculated by a nitrogen adsorption BET method using a specific surface area measuring apparatus (HM model-1208, manufactured by Mountech Co., Ltd.). Degassing was carried out at 105° C. for 20 minutes in the case of the hydroxide, and at 200° C. for 20 minutes in the case of the cathode active material.

Production of Cathode Active Material

Ex. 1

Preparation of Hydroxide:

In distilled water, nickel(II) sulfate hexahydrate (manufactured by KANTO CHEMICAL CO., INC) and manganese(II) sulfate pentahydrate (manufactured by KANTO CHEMICAL CO., INC) were dissolved so that the molar ratio of Ni and Mn would be as identified in Table 2 and that the total amount of the sulfates would be 1.5 mol/kg, and ammonium sulfate (manufactured by KANTO CHEMICAL CO., INC) as a complexing agent was dissolved so that the concentration would be 0.15 mol/kg, to obtain an aqueous sulfate solution. As a pH adjusting solution, sodium hydroxide (manufactured by KANTO CHEMICAL CO., INC) was dissolved in distilled water so that the concentration would be 12 mass % to prepare an aqueous sodium hydroxide solution.

Into a 30 L baffle-equipped glass reactor, distilled water was put and heated to 50° C. by a mantle heater. While stirring the liquid in the reactor by a paddle type stirring blade, the aqueous sulfate solution was added at a rate of 75 g/minute for 5 hours, and the pH adjusting solution was added to maintain the pH of the mixed liquid to be 10.5, to obtain a hydroxide containing Ni and Mn. During the addition of the raw material solution, nitrogen gas was made to flow at a rate of 4.0 L/min in the reactor. Further, a liquid containing no hydroxide was continuously withdrawn using filter cloth, so that the liquid amount in the reactor would not exceed 30 L. In order to remove impurity ions from the obtained hydroxide, pressure filtration and dispersion in distilled water were repeated for washing. Washing was completed at a point where the electrical conductivity of the filtrate became 20 mS/m, and the hydroxide was dried at 120° C. for 15 hours. The results of evaluations of the hydroxide are shown in Table 2.

Mixing Step:

Lithium carbonate (manufactured by SQM, MIC grade), sodium carbonate (manufactured by KANTO CHEMICAL CO., INC) and the hydroxide obtained by the above method were mixed to obtain a mixture. Sodium carbonate was subjected to filtration through a filter with an aperture of 45 μm, and mixed with lithium carbonate in a reclosable plastic bag. Then, the hydroxide was put and mixed. The mixing ratio was such that the ratio of the sum of the molar amount of Li contained in lithium carbonate and the molar amount of Na contained in sodium carbonate to the total molar amount (X) of Ni, Co and Mn contained in the hydroxide (i.e. (Li+Na)/X) would be 1.57 and that the ratio of the molar amount of Na to the total molar amount (X) (i.e. Na/X) would be 0.04. The theoretical value of Li/X calculated from Co and Mn contained in the hydroxide was 1.5. The essential points in the mixing step are shown in Table 3.

Firing Step:

In an electric furnace, while supplying air, the mixture was subjected to temporary firing at 600° C. in air over a period of 3 hours to obtain a temporarily fired product. Then, in an electric furnace, while supplying air, the temporarily fired product was subjected to main firing at 990° C. in air over a period of 16 hours to obtain a first lithium-containing composite oxide. The essential points in the firing step are shown in Table 3.

Alkali Removing Step:

18 g of the obtained first lithium-containing composite oxide and 72 g of distilled water were put in a polypropylene (PP) container and stirred by a rotor at 15 rpm at room temperature for 1 hour. Then, the mixture was subjected to suction filtration using a filter paper with a pore size of 1 μm while running 72 g of distilled water, and the residue on the filter paper was dried at 80° C. for 12 hours to obtain a second lithium-containing composite oxide. The second lithium-containing composite oxide thus obtained was used as a cathode active material 1. The results of evaluations of the obtained cathode active material 1 are shown in Table 4.

Ex. 2

Mixing Step:

Lithium carbonate, sodium carbonate and the hydroxide used in Ex. 1 were mixed to obtain a mixture. The mixing ratio was as identified in Table 3.

The firing step and the alkali removing step were carried out in the same manner as in Ex. 1 to obtain the second lithium-containing composite oxide. The obtained second lithium-containing composite oxide was used as a cathode active material 2. The results of evaluations of the cathode active material 2 are shown in Table 4.

Ex. 3

A second lithium-containing composite oxide was obtained in the same manner as in Ex. 1 except that the alkali removing step was carried out as follows.

Alkali Removing Step:

18 g of the obtained first lithium-containing composite oxide and 72 g of a 2.5 mass % aqueous lactic acid solution were put in a PP container and stirred by a rotor at 15 rpm at room temperature for 1 hour. The pH of the aqueous lactic acid solution was 2.1, and the relative amount (A1) of the acid component was 0.120. Then, the mixture was subjected to suction filtration using a filter paper with a pore size of 1 μm while running 72 g of distilled water, and the residue on the filter paper was dried at 80° C. for 12 hours. The obtained second lithium-containing composite oxide was used as a cathode active material 3. The results of evaluations of the cathode active material 3 are shown in Table 4.

Ex. 4

A second lithium-containing composite oxide was obtained in the same manner as in Ex. 1 except that the mixing ratio in the mixing step was as identified in Table 3, and the alkali removing step was carried out in the same manner as in Ex. 3. The obtained second lithium-containing composite oxide was used as a cathode active material 4. The results of evaluations of the cathode active material 4 are shown in Table 4.

Ex. 5

A second lithium-containing composite oxide was obtained in the same manner as in Ex. 1 except that no alkali removing step was carried out. The obtained second lithium-containing composite oxide was used as a cathode active material 5. The results of evaluations of the cathode active material 5 are shown in Table 4.

Ex. 6

A second lithium-containing composite oxide was obtained in the same manner as in Ex. 2 except that no alkali removing step was carried out. The obtained second lithium-containing composite oxide was used as a cathode active material 6. The results of evaluations of the cathode active material 6 are shown in Table 4.

Ex. 7

Preparation of Hydroxide:

In distilled water, nickel(II) sulfate hexahydrate (manufactured by KANTO CHEMICAL CO., INC) and manganese(II) sulfate pentahydrate (manufactured by KANTO CHEMICAL CO., INC) were dissolved so that the molar ratio of Ni and Mn would be as identified in Table 2 and that the total amount of the sulfates would be 1.5 mol/kg, and ammonium sulfate (manufactured by KANTO CHEMICAL CO., INC) as a complexing agent was dissolved so that the concentration would be 0.15 mol/kg, to obtain an aqueous sulfate solution. As a pH adjusting solution, sodium hydroxide (manufactured by KANTO CHEMICAL CO., INC) was dissolved in distilled water so that the concentration would be 12 mass % to prepare an aqueous sodium hydroxide solution.

Into a 2 L baffle-equipped glass reactor, distilled water was put and heated to 50° C. by a mantle heater. While stirring the liquid in the reactor by a paddle type stirring blade, the aqueous sulfate solution was added at a rate of 5.0 g/minute for 5 hours, and the pH adjusting solution was added to maintain the pH of the mixed liquid to be 11, to obtain a hydroxide containing Ni and Mn. During the addition of the raw material solution, nitrogen gas was made to flow at a rate of 4.0 L/min in the reactor. Further, a liquid containing no hydroxide was continuously withdrawn using filter cloth, so that the liquid amount in the reactor would not exceed 2 L. In order to remove impurity ions from the obtained hydroxide, pressure filtration and dispersion in distilled water were repeated for washing. Washing was completed at a point where the electrical conductivity of the filtrate became 20 mS/m, and the hydroxide was dried at 120° C. for 15 hours. The results of evaluations of the hydroxide are shown in Table 2.

Mixing Step:

Lithium carbonate (manufactured by SQM, MIC grade), sodium carbonate (manufactured by KANTO CHEMICAL CO., INC) and the hydroxide obtained by the above method were mixed to obtain a mixture. Sodium carbonate was subjected to filtration through a filter with an aperture of 45 μm, and mixed with lithium carbonate in a reclosable plastic bag. Then, the hydroxide was put and mixed. The mixing ratio was such that the ratio of the sum of the molar amount of Li contained in lithium carbonate and the molar amount of Na contained in sodium carbonate to the total molar amount (X) of Ni, Co and Mn contained in the hydroxide (i.e. (Li+Na)/X) would be 1.58 and that the ratio of the molar amount of Na to the total molar amount (X) (i.e. Na/X) would be 0.04. The theoretical value of Li/X calculated from Co and Mn contained in the hydroxide was 1.5. The essential points in the mixing step are shown in Table 3.

Firing Step:

In an electric furnace, while supplying air, the mixture was subjected to temporary firing at 600° C. in air over a period of 3 hours to obtain a temporarily fired product. Then, in an electric furnace, while supplying air, the temporarily fired product was subjected to main firing at 990° C. in air over a period of 16 hours to obtain a first lithium-containing composite oxide. The essential points in the firing step are shown in Table 3.

Alkali Removing Step:

18 g of the obtained first lithium-containing composite oxide and 72 g of distilled water were put in a PP container and stirred by a rotor at 15 rpm at room temperature for 1 hour. The pH of the distilled water was 6.1. Then, the mixture was subjected to suction filtration using a filter paper with a pore size of 1 μm while running 72 g of distilled water, and the residue on the filter paper was dried at 80° C. for 12 hours to obtain a second lithium-containing composite oxide. The second lithium-containing composite oxide thus obtained was used as a cathode active material 7. The results of evaluations of the obtained cathode active material 7 are shown in Table 4.

Ex. 8

A second lithium-containing composite oxide was obtained in the same manner as in Ex. 7 except that the alkali removing step was carried out as follows.

Alkali Removing Step:

18 g of the obtained first lithium-containing composite oxide and 72 g of a 0.5 mass % aqueous lactic acid solution were put in a PP container and stirred by a rotor at 15 rpm at room temperature for 1 hour. The pH of the aqueous lactic acid solution was 2.5, and the relative amount (A1) of the acid component was 0.024. Then, the mixture was subjected to suction filtration using a filter paper with a pore size of 1 μm while running 72 g of distilled water, and the residue on the filter paper was dried at 80° C. for 12 hours. The obtained second lithium-containing composite oxide was used as a cathode active material 8. The results of evaluations of the cathode active material 8 are shown in Table 4.

Ex. 9

A second lithium-containing composite oxide was obtained in the same manner as in Ex. 7 except that the alkali removing step was carried out as follows.

Alkali Removing Step:

18 g of the obtained first lithium-containing composite oxide and 72 g of a 0.1 mol % aqueous nitric acid solution were put in a PP container and stirred by a rotor at 15 rpm at room temperature for 1 hour. The pH of the aqueous nitric acid solution was 1.2, and the relative amount (A1) of the acid component was 0.041. Then, the mixture was subjected to suction filtration using a filter paper with a pore size of 1 μm while running 72 g of distilled water, and the residue on the filter paper was dried at 80° C. for 12 hours. The obtained second lithium-containing composite oxide was used as a cathode active material 9. The results of evaluations of the cathode active material 9 are shown in Table 4.

Ex. 10

A second lithium-containing composite oxide was obtained in the same manner as in Ex. 9 except that in the mixing step, the ratio of the sum of the molar amount of Li contained in lithium carbonate and the molar amount of Na contained in sodium carbonate (i.e. (Li+Na)/X) was 1.58 and that the ratio of the molar amount of Na to the total molar amount (X) (i.e. Na/X) was 0.08. The obtained second lithium-containing composite oxide was used as a cathode active material 10. The results of evaluations of the cathode active material 10 are shown in Table 4.

Ex. 11

A second lithium-containing composite oxide was obtained in the same manner as in Ex. 9 except that in the mixing step, the ratio of the sum of the molar amount of Li contained in lithium carbonate and the molar amount of Na contained in sodium carbonate (i.e. (Li+Na)/X) was 1.58 and that the ratio of the molar amount of Na to the total molar amount (X) (i.e. Na/X) was 0.12. The obtained second lithium-containing composite oxide was used as a cathode active material 11. The results of evaluations of the cathode active material 11 are shown in Table 4.

Ex. 12 to 17

In the mixing step, the ratio of the sum of the molar amount of Li contained in lithium carbonate and the molar amount of Na contained in sodium carbonate (i.e. (Li+Na)/X) was 1.58, and the ratio of the molar amount of Na to the total molar amount (X) (i.e. Na/X) was as identified in Table 3.

The firing step was carried out in the same manner as in Ex. 7, and in Ex. 12 to 15, no alkali removing step was carried out, whereby second lithium-containing composite oxides in Ex. 12 to 17 were obtained. The obtained second lithium-containing composite oxides were used as cathode active materials 12 to 17. The results of evaluations of the cathode active materials 12 to 17 are shown in Table 4.

TABLE 2

| | Hydroxide preparation conditions | | | | | | | |
|---|---|---|---|---|---|---|---|---|
| | pH adjusting solution alkali species | Reaction tank | Raw material concentration mol/kg | Raw material supply rate g/min | Reaction time h | Initial pH | Controlled pH | Reaction temperature ° C. | NH$_4$/X ratio |
| Ex. 1 | NaOH | 30 L | 1.5 | 75 | 5 | 10.5 | 10.5 | 50 | 0.1 |
| Ex. 2 | NaOH | 30 L | 1.5 | 75 | 5 | 10.5 | 10.5 | 50 | 0.1 |
| Ex. 3 | NaOH | 30 L | 1.5 | 75 | 5 | 10.5 | 10.5 | 50 | 0.1 |
| Ex. 4 | NaOH | 30 L | 1.5 | 75 | 5 | 10.5 | 10.5 | 50 | 0.1 |
| Ex. 5 | NaOH | 30 L | 1.5 | 75 | 5 | 10.5 | 10.5 | 50 | 0.1 |
| Ex. 6 | NaOH | 30 L | 1.5 | 75 | 5 | 10.5 | 10.5 | 50 | 0.1 |
| Ex. 7 | NaOH | 2 L | 1.5 | 5 | 5 | 11 | 11 | 50 | 0.1 |
| Ex. 8 | NaOH | 2 L | 1.5 | 5 | 5 | 11 | 11 | 50 | 0.1 |

TABLE 2-continued

| | | | | | | | | | |
|---|---|---|---|---|---|---|---|---|---|
| Ex. 9 | NaOH | 2 L | 1.5 | 5 | 5 | 11 | 11 | 50 | 0.1 |
| Ex. 10 | NaOH | 30 L | 1.5 | 75 | 5 | 11 | 11 | 50 | 0.1 |
| Ex. 11 | NaOH | 30 L | 1.5 | 75 | 5 | 11 | 11 | 50 | 0.1 |
| Ex. 12 | NaOH | 2 L | 1.5 | 5 | 5 | 11 | 11 | 50 | 0.1 |
| Ex. 13 | NaOH | 2 L | 1.5 | 5 | 5 | 11 | 11 | 50 | 0.1 |
| Ex. 14 | NaOH | 30 L | 1.5 | 75 | 5 | 11 | 11 | 50 | 0.1 |
| Ex. 15 | NaOH | 30 L | 1.5 | 75 | 5 | 11 | 11 | 50 | 0.1 |
| Ex. 16 | NaOH | 30 L | 1.5 | 75 | 5 | 11 | 11 | 50 | 0.1 |
| Ex. 17 | NaOH | 30 L | 1.5 | 75 | 5 | 11 | 11 | 50 | 0.1 |

| | Hydroxide composition | | | Hydroxide physical properties | | | |
|---|---|---|---|---|---|---|---|
| | (molar ratio) | | | $D_{10}$ | $D_{50}$ | $D_{90}$ | Specific surface area |
| | Ni | Co | Mn | μm | μm | μm | m$^2$/g |
| Ex. 1 | 25.0 | 0.0 | 75.0 | 5.4 | 7.3 | 10.6 | 51.3 |
| Ex. 2 | 25.0 | 0.0 | 75.0 | 5.4 | 7.3 | 10.6 | 51.3 |
| Ex. 3 | 25.0 | 0.0 | 75.0 | 5.4 | 7.3 | 10.6 | 51.3 |
| Ex. 4 | 25.0 | 0.0 | 75.0 | 5.4 | 7.3 | 10.6 | 51.3 |
| Ex. 5 | 25.0 | 0.0 | 75.0 | 5.4 | 7.3 | 10.6 | 51.3 |
| Ex. 6 | 25.0 | 0.0 | 75.0 | 5.4 | 7.3 | 10.6 | 51.3 |
| Ex. 7 | 25.0 | 0.0 | 75.0 | 2.0 | 3.7 | 6.8 | 61.2 |
| Ex. 8 | 25.0 | 0.0 | 75.0 | 2.0 | 3.7 | 6.8 | 61.2 |
| Ex. 9 | 25.0 | 0.0 | 75.0 | 2.0 | 3.7 | 6.8 | 61.2 |
| Ex. 10 | 25.0 | 0.0 | 75.0 | 1.2 | 3.1 | 5.3 | 71.0 |
| Ex. 11 | 25.0 | 0.0 | 75.0 | 1.2 | 3.1 | 5.3 | 71.0 |
| Ex. 12 | 25.0 | 0.0 | 75.0 | 2.0 | 3.7 | 6.8 | 61.2 |
| Ex. 13 | 25.0 | 0.0 | 75.0 | 2.0 | 3.7 | 6.8 | 61.2 |
| Ex. 14 | 25.0 | 0.0 | 75.0 | 1.2 | 3.1 | 5.3 | 71.0 |
| Ex. 15 | 25.0 | 0.0 | 75.0 | 1.2 | 3.1 | 5.3 | 71.0 |
| Ex. 16 | 25.0 | 0.0 | 75.0 | 1.2 | 3.1 | 5.3 | 71.0 |
| Ex. 17 | 25.0 | 0.0 | 75.0 | 1.2 | 3.1 | 5.3 | 71.0 |

TABLE 3

| | Mixing step | | | | Firing step | | | | | |
|---|---|---|---|---|---|---|---|---|---|---|
| | Charge | | | Theo- | Temporary firing | | | Main firing | | |
| | Charge (Li + R)/X | Charge Li/X | Charge Na/X | retical Li/X | ° C. | h | Atmo-sphere | ° C. | h | Atmo-sphere |
| Ex. 1 | 1.57 | 1.53 | 0.04 | 1.50 | 600 | 3 | Air | 990 | 16 | Air |
| Ex. 2 | 1.57 | 1.49 | 0.08 | 1.50 | 600 | 3 | Air | 990 | 16 | Air |
| Ex. 3 | 1.57 | 1.53 | 0.04 | 1.50 | 600 | 3 | Air | 990 | 16 | Air |
| Ex. 4 | 1.57 | 1.49 | 0.08 | 1.50 | 600 | 3 | Air | 990 | 16 | Air |
| Ex. 5 | 1.57 | 1.53 | 0.04 | 1.50 | 600 | 3 | Air | 990 | 16 | Air |
| Ex. 6 | 1.57 | 1.49 | 0.08 | 1.50 | 600 | 3 | Air | 990 | 16 | Air |
| Ex. 7 | 1.58 | 1.54 | 0.04 | 1.50 | 600 | 3 | Air | 990 | 16 | Air |
| Ex. 8 | 1.58 | 1.54 | 0.04 | 1.50 | 600 | 3 | Air | 990 | 16 | Air |
| Ex. 9 | 1.58 | 1.54 | 0.04 | 1.50 | 600 | 3 | Air | 990 | 16 | Air |
| Ex. 10 | 1.58 | 1.5 | 0.08 | 1.50 | 600 | 3 | Air | 990 | 16 | Air |
| Ex. 11 | 1.58 | 1.46 | 0.12 | 1.50 | 600 | 3 | Air | 990 | 16 | Air |
| Ex. 12 | 1.58 | 1.58 | 0 | 1.50 | 600 | 3 | Air | 990 | 16 | Air |
| Ex. 13 | 1.58 | 1.54 | 0.04 | 1.50 | 600 | 3 | Air | 990 | 16 | Air |
| Ex. 14 | 1.58 | 1.5 | 0.08 | 1.50 | 600 | 3 | Air | 990 | 16 | Air |
| Ex. 15 | 1.58 | 1.46 | 0.12 | 1.50 | 600 | 3 | Air | 990 | 16 | Air |
| Ex. 16 | 1.58 | 1.42 | 0.16 | 1.50 | 600 | 3 | Air | 990 | 16 | Air |
| Ex. 17 | 1.58 | 1.34 | 0.24 | 1.50 | 600 | 3 | Air | 990 | 16 | Air |

| | Alkali removing | | |
|---|---|---|---|
| | Aqueous solution | Relative amount (A1) of acid component | pH of aqueous solution |
| Ex. 1 | Water | — | 6.1 |
| Ex. 2 | Water | — | 6.1 |
| Ex. 3 | 2.5 wt % lactic acid | 0.120 | 2.1 |
| Ex. 4 | 2.5 wt % lactic acid | 0.121 | 2.1 |
| Ex. 5 | — | — | — |
| Ex. 6 | — | — | — |
| Ex. 7 | Water | — | 6.1 |
| Ex. 8 | 0.5 wt % lactic acid | 0.024 | 2.5 |

TABLE 3-continued

| | | | |
|---|---|---|---|
| Ex. 9 | 0.1M nitric acid | 0.041 | 1.2 |
| Ex. 10 | 0.1M nitric acid | 0.041 | 1.2 |
| Ex. 11 | 0.1M nitric acid | 0.041 | 1.2 |
| Ex. 12 | — | — | — |
| Ex. 13 | — | — | — |
| Ex. 14 | — | — | — |
| Ex. 15 | — | — | — |
| Ex. 16 | 0.1M nitric acid | 0.042 | 1.2 |
| Ex. 17 | 0.1M nitric acid | 0.042 | 1.2 |

TABLE 4

| | Lithium-containing composite oxide | | | | | | Particle size distribution | | | Specific surface area | Crystallite diameter | | | Integral breadth of peak of (110) plane |
|---|---|---|---|---|---|---|---|---|---|---|---|---|---|---|
| | Li | Na | a | $\alpha$ | $\beta$ | $\gamma$ | $D_{10}$ μm | $D_{50}$ μm | $D_{90}$ μm | m$^2$/g | $D_{003}$ nm | $D_{110}$ nm | $H_{110}/H_{003}$ | |
| Ex. 1 | 1.523 | 0.004 | 0.626 | 0.533 | 0.000 | 0.467 | 4.7 | 7.6 | 14.6 | 1.93 | 103.2 | 61.2 | 0.026 | 0.208 |
| Ex. 2 | 1.520 | 0.011 | 0.629 | 0.537 | 0.000 | 0.463 | 4.5 | 7.7 | 21.2 | 2.02 | 104.9 | 65.0 | 0.037 | 0.140 |
| Ex. 3 | 1.492 | 0.003 | 0.594 | 0.496 | 0.000 | 0.504 | 4.9 | 8.1 | 14.6 | 2.06 | 101.1 | 53.4 | 0.025 | 0.189 |
| Ex. 4 | 1.487 | 0.009 | 0.597 | 0.497 | 0.000 | 0.503 | 4.7 | 7.4 | 12.7 | 2.24 | 104.1 | 58.5 | 0.033 | 0.141 |
| Ex. 5 | 1.515 | 0.037 | 0.648 | 0.561 | 0.000 | 0.439 | 5.1 | 8.2 | 14.1 | 1.83 | 107.1 | 60.4 | 0.026 | 0.206 |
| Ex. 6 | 1.510 | 0.054 | 0.660 | 0.577 | 0.000 | 0.423 | 5.0 | 7.7 | 13.0 | 1.83 | 92.5 | 65.0 | 0.039 | 0.153 |
| Ex. 7 | 1.507 | 0.003 | 0.609 | 0.511 | 0.000 | 0.489 | 3.7 | 8.3 | 39.0 | 3.20 | 92.5 | 70.2 | 0.034 | 0.349 |
| Ex. 8 | 1.494 | 0.002 | 0.597 | 0.497 | 0.000 | 0.503 | 3.7 | 7.3 | 17.7 | 3.18 | 92.6 | 68.2 | 0.032 | 0.317 |
| Ex. 9 | 1.490 | 0.002 | 0.592 | 0.493 | 0.000 | 0.507 | 2.8 | 5.0 | 11.4 | 3.21 | 91.9 | 66.6 | 0.032 | 0.333 |
| Ex. 10 | 1.462 | 0.005 | 0.569 | 0.467 | 0.000 | 0.533 | 3.1 | 6.9 | 35.9 | 3.31 | — | — | 0.032 | 0.390 |
| Ex. 11 | 1.446 | 0.011 | 0.558 | 0.458 | 0.000 | 0.542 | 3.4 | 9.3 | 51.1 | 3.57 | — | — | 0.034 | 0.434 |
| Ex. 12 | 1.553 | 0.000 | 0.650 | 0.562 | 0.000 | 0.438 | 2.9 | 5.2 | 11.2 | 2.97 | 91.5 | 66.0 | 0.014 | 0.854 |
| Ex. 13 | 1.511 | 0.027 | 0.636 | 0.542 | 0.000 | 0.458 | 3.6 | 7.2 | 17.1 | 3.13 | 93.6 | 71.2 | 0.035 | 0.338 |
| Ex. 14 | 1.491 | 0.034 | 0.624 | 0.526 | 0.000 | 0.474 | 3.4 | 6.8 | 15.3 | 3.30 | 90.6 | 75.1 | 0.038 | 0.326 |
| Ex. 15 | 1.488 | 0.054 | 0.639 | 0.545 | 0.000 | 0.455 | 3.0 | 5.7 | 13.4 | 3.69 | 79.0 | 73.7 | 0.043 | 0.379 |
| Ex. 16 | 1.444 | 0.023 | 0.568 | 0.469 | 0.000 | 0.531 | 2.8 | 5.1 | 15.7 | 4.73 | 73.5 | 60.9 | 0.032 | 0.390 |
| Ex. 17 | 1.386 | 0.039 | 0.526 | 0.435 | 0.000 | 0.565 | 2.6 | 5.4 | 28.3 | 6.21 | 65.2 | 45.7 | 0.034 | 0.434 |

Battery Evaluation

Production of Positive Electrode Sheet

Each of the cathode active materials 1 to 17 obtained in Ex. 1 to 17, electrically conductive carbon black (SuperC65, tradename, manufactured by TIMCAL Ltd.) as an electrically conductive material, and polyvinylidene fluoride as a binder were weighed in a mass ratio of 88:6:6, and they were added to N-methylpyrrolidone to prepare a slurry.

The slurry was applied on one side of an aluminum foil as a positive electrode current collector having a thickness of 20 μm by means of a doctor blade. The gap of the doctor blade was adjusted so that the thickness of the sheet after roll pressing would be 20 μm. After drying at 120° C., roll pressing was carried out twice to prepare a positive electrode sheet.

Production of Lithium Secondary Battery

One having the positive electrode sheet punched out in a circular shape with a diameter of 18 mm, was used as a positive electrode. A Li foil punched out in a circular shape with a diameter of 19 mm was used as a negative electrode. As a separator, a porous polypropylene having a thickness of 25 μm was used. As an electrolytic solution, a liquid having LiPF$_6$ dissolved at a concentration of 1 mol/L in a solvent mixture of ethylene carbonate and diethyl carbonate in a volume ratio of 3:7, was used.

Using the positive electrode, negative electrode, separator and electrolytic solution, flange type lithium secondary batteries 1 to 17 were assembled in a globe box in an argon atmosphere.

Activation Treatment and Measurement of Initial Efficiency

With respect to each of the lithium secondary batteries 1 to 17 using the cathode active materials in Ex. 1 to 17, constant current charging to 4.8 V with a load current of 26 mA per 1 g of the cathode active material, and then constant current discharging to 2 V with a load current of 26 mA per 1 g of the cathode active material, were carried out to conduct activation treatment. From the charge capacity and the discharge capacity, the initial efficiency (%) (=(discharge capacity/charge capacity)×100) was calculated. The results are shown in Table 5.

TABLE 5

| | Initial charge and discharge | | |
|---|---|---|---|
| | Charge capacity mAh/g | Discharge capacity mAh/g | Initial efficiency % |
| Ex. 1 | 321 | 244 | 75.9 |
| Ex. 2 | 322 | 243 | 75.4 |
| Ex. 3 | 302 | 237 | 78.5 |
| Ex. 4 | 309 | 247 | 79.8 |
| Ex. 5 | 309 | 231 | 74.7 |
| Ex. 6 | 295 | 214 | 72.6 |

TABLE 5-continued

| | Initial charge and discharge | | |
|---|---|---|---|
| | Charge capacity mAh/g | Discharge capacity mAh/g | Initial efficiency % |
| Ex. 7 | 330 | 267 | 80.9 |
| Ex. 8 | 326 | 268 | 82.2 |
| Ex. 9 | 324 | 269 | 82.9 |
| Ex. 10 | 309 | 260 | 84.3 |
| Ex. 11 | 305 | 262 | 85.8 |
| Ex. 12 | 332 | 266 | 80.1 |
| Ex. 13 | 323 | 257 | 79.6 |
| Ex. 14 | 296 | 232 | 78.5 |
| Ex. 15 | 289 | 227 | 78.7 |
| Ex. 16 | 292 | 262 | 89.7 |
| Ex. 17 | 258 | 239 | 92.5 |

As shown in Table 5, by comparison of the cathode active materials 1 to 6 obtained in Ex. 1 to 6, according to the cathode active materials 1 to 4 obtained by the present production process, as compared with the cathode active materials 5 and 6 obtained by other production process, the charge and discharge capacity of the obtainable lithium secondary battery did not decrease, and the initial efficiency was high.

Further, by comparison of the cathode active materials 7 to 17 obtained in Ex. 7 to 17, according to the cathode active materials 7 to 11, 16 and 17 obtained by the present production process, as compared with the cathode active material 12 obtained by a conventional production process and the cathode active materials 13 to 15 obtained by other production process, the charge and discharge capacity of the obtainable lithium secondary battery did not decrease, and the initial efficiency was high.

It is considered that the initial efficiency of the lithium secondary battery is high as a whole since the cathode active materials 7 to 17 have a larger specific surface area than the cathode active materials 1 to 6. Accordingly, it was confirmed that by the present production process, in production of a cathode active material having the same specific surface area, it is possible to obtain a cathode active material capable of obtaining a lithium secondary battery of which the charge and discharge capacity does not decrease and which has a high initial efficiency.

The reason why the charge and discharge capacity of a lithium secondary battery using the cathode active material obtained by the present production process does not decrease and the initial efficiency is high is not clearly understood, however, the following are considered as one reason.

In the present production process, in the mixing step, the alkali metal is mixed, and the alkali metal is removed after the firing step, and accordingly the ratio of Li to the total molar amount of the transition metals is substantially low when the cathode active material is produced. Accordingly, in the cathode active material, at the initial charging, Li withdrawn from the cathode active material to the anode active material is small, and as a result, the initial efficiency of the lithium secondary battery is high.

In a case where the ratio of Li to the total molar amount of the transition metals is substantially low, the lithium-containing composite oxide may have a heterogeneous phase, whereby the charge and discharge capacity of the lithium secondary battery becomes low. However, with respect to the first lithium-containing composite oxides obtained in Ex. 16 representing the present production process, Ex. 12 representing a conventional production process and Ex. 14 which is a reference example, no heterogeneous phase is observed in a X-ray diffraction pattern at 2θ=19 to 23 deg. Further, with respect to the first lithium-containing composite oxides in Ex. 1 to 4, 7 to 11 and 17, in the same manner as in Ex. 16, no phase other than space group R-3m and space group C2/m was confirmed in XRD measurement. This is considered to be because in the firing step, Li and an alkali metal having an ion radius close to that of Li are contained, and accordingly no heterogeneous phase other than crystal phases assigned to crystal structures with space group R-3m and space group C2/m occurred in the first lithium-containing composite oxide.

The initial efficiency of the secondary battery using the cathode active material obtained by the present production process was evaluated by a lithium secondary battery, however, the form of the secondary battery is not limited. The cathode active material obtained by the present production process has the same effect even when used for a lithium ion secondary battery using a negative electrode other than the Li foil.

The entire disclosure of Japanese Patent Application No. 2015-221307 filed on Nov. 11, 2015 including specification, claims, drawings and summary is incorporated herein by reference in its entirety.

The invention claimed is:

1. A process for producing a cathode active material, comprising:
a step of mixing a lithium compound, an alkali metal compound other than Li, and a transition metal-containing compound containing at least Ni and Mn to obtain a mixture,
a step of firing the mixture at a temperature of from 900 to 1,100° C. to obtain a first lithium-containing composite oxide containing the alkali metal other than Li, and
a step of removing the alkali metal other than Li from the first lithium-containing composite oxide to obtain secondary particles having a plurality of primary particles of a second lithium-containing composite oxide agglomerated represented by the following formula 1:

$$aLi(Li_{1/3}Mn_{2/3})O_2 \cdot (1-a)LiMO_2 \qquad \text{formula 1}$$

wherein 0<a<1, and M is an alkali metal other than Li and an element containing at least transition metals Ni and Mn and a ratio of a molar amount of the alkali metal other than Li to a total molar amount of the transition metals is at least 0.001 and at most 0.004, and in an X-ray diffraction pattern of the lithium-containing composite oxide, a ratio of a height ($H_{110}$) of a peak of (110) plane assigned to a crystal structure with space group C2/m to a height ($H_{003}$) of a peak of (003) plane assigned to a crystal structure with space group R-3m (i.e. $H_{110}/H_{003}$) is at least 0.018, and an integral breadth of a peak of (110) plane assigned to a crystal structure with space group C2/m is at most 0.5 deg.

2. The process for producing a cathode active material according to claim 1, wherein in the step to obtain the second lithium-containing composite oxide, the first lithium-containing composite oxide and an aqueous solution having a pH of at most 8 are brought into contact with each other, to remove the alkali metal other than Li.

3. The process for producing a cathode active material according to claim 2, wherein the aqueous solution having a pH of at most 8 contains an acid component, and the relative amount (A1) of the acid component calculated in accordance with the following formula 2 from the acid component and the first lithium-containing composite oxide is from 0.005 to 0.20:

relative amount (A1) of acid component={molar amount of acid component contained in aqueous solution having pH of at most 8/total molar amount of transition metal element contained in first lithium-containing composite oxide}×{absolute value of valency of acid component}   formula 2

4. The process for producing a cathode active material according to claim 2, wherein the aqueous solution having a pH of at most 8 is an aqueous solution of at least one member selected from the group consisting of nitric acid, sulfuric acid, hydrochloric acid, lactic acid and acetic acid.

5. The process for producing a cathode active material according to claim 1, wherein in the mixing step, the transition metal-containing compound may contain Co, and the ratio of the total molar amount of Li contained in the lithium compound and the alkali metal (R) in the alkali metal compound other than Li (i.e. Li+R) to a total molar amount (X) of Ni, Co and Mn contained in the transition metal-containing compound (i.e. (Li+R)/X) is higher than a ratio of the molar amount of Li to the total molar amount (X) of Ni, Co and Mn contained in the transition metal-containing compound (i.e. Li/X) as a theoretical value.

6. The process for producing a cathode active material according to claim 1, wherein in the mixing step, the transition metal-containing compound may contain Co, and a ratio of a total molar amount of Li contained in the lithium compound and the alkali metal (R) in the alkali metal compound other than Li (i.e. Li+R) to a total molar amount (X) of Ni, Co and Mn contained in the transition metal-containing compound (i.e. (Li+R)/X) is from 1.1 to 1.8.

7. The process for producing a cathode active material according to claim 1, wherein in the mixing step, the transition metal-containing compound may contain Co, and a ratio of a molar amount of the alkali metal (R) contained in the alkali metal compound other than Li to a total molar amount (X) of Ni, Co and Mn contained in the transition metal-containing compound (i.e. R/X) is from 0.001 to 0.5.

8. The process for producing a cathode active material according to claim 1, wherein the second lithium-containing composite oxide is represented by the following formula 3:

aLi(Li$_{1/3}$Mn$_{2/3}$)O$_2$·(1−a)LiNi$_\alpha$Co$_\beta$Mn$_\gamma$M'$_\delta$O$_2$   formula 3 wherein M' is an alkali metal other than Li and one or more of F, P, Mg, Ca, Ba, Sr, Al, Cr, Fe, Ti, Zr, Y, Nb, Mo, Ta, W, Ce, or La, and $\alpha+\beta+\gamma+\delta=1$.

9. The process for producing a cathode active material according to claim 1, wherein of the second lithium-containing composite oxide, in an X-ray diffraction pattern, the crystallite diameter (D$_{003}$) obtained by the Scherrer equation from a peak of (003) plane is from 60 to 140 nm.

10. The process for producing a cathode active material according to claim 1, wherein of the second lithium-containing composite oxide, in an X-ray diffraction pattern, the crystallite diameter (D$_{110}$) obtained by the Scherrer equation from a peak of (110) plane is from 30 to 80 nm.

11. The process for producing a cathode active material according to claim 1, wherein of the second lithium-containing composite oxide, in an X-ray diffraction pattern, a ratio of a height (H$_{110}$) of a peak of (110) plane assigned to a crystal structure with space group C2/m to a height (H$_{003}$) of a peak of (003) plane assigned to a crystal structure with space group R-3m (i.e. H$_{110}$/H$_{003}$) is from 0.018 to 0.06.

12. A cathode active material, which comprises secondary particles having a plurality of primary particles of a lithium-containing composite oxide agglomerated, wherein the lithium-containing composite oxide is represented by the formula: aLi(Li$_{1/3}$Mn$_{2/3}$)O$_2$·(1−a)LiMO$_2$, wherein M is an alkali metal other than Li and an element containing at least transition metals Ni and Mn, and 0<a<1), and a ratio of a molar amount of the alkali metal other than Li to a total molar amount of the transition metals is at least 0.001 and at most 0.04, and in an X-ray diffraction pattern of the lithium-containing composite oxide, a ratio of a height (H$_{110}$) of a peak of (110) plane assigned to a crystal structure with space group C2/m to the height (H$_{003}$) of a peak of (003) plane assigned to a crystal structure with space group R-3m (i.e. H$_{110}$/H$_{003}$) is at least 0.018, and an integral breadth of a peak of (110) plane assigned to a crystal structure with space group C2/m is at most 0.5 deg.

13. The cathode active material according to claim 12, wherein the lithium-containing composite oxide is represented by the following formula 3:

aLi(Li$_{1/3}$Mn$_{2/3}$)O$_2$·(1−a)LiNi$_\alpha$Co$_\beta$Mn$_\gamma$M'$_\delta$O$_2$   formula 3 wherein M' is an alkali metal other thhan Li and one or more of F, P, Mg, Ca, Ba, Sr, Al, Cr, Fe, Ti, Zr, Y, Nb, Mo, Ta, W, Ce, or La, and $\alpha+\beta+\gamma+\delta=1$.

14. The cathode active material according to claim 12, wherein of the lithium-containing composite oxide, in an X-ray diffraction pattern, the crystallite diameter (D$_{003}$) obtained by the Scherrer equation from a peak of (003) plane is from 60 to 140 nm.

15. The cathode active material according to claim 12, wherein of the lithium-containing composite oxide, in an X-ray diffraction pattern, the crystallite diameter (D$_{110}$) obtained by the Scherrer equation from a peak of (110) plane is from 30 to 80 nm.

16. A positive electrode for a lithium ion secondary battery, which comprises a cathode active material layer containing the cathode active material as defined in claim 12, a binder and an electrically conductive material, formed on a current collector.

17. A lithium ion secondary battery, which comprises the positive electrode for a lithium ion secondary battery as defined in claim 16, a negative electrode, a separator and a non-aqueous electrolyte.

* * * * *